United States Patent [19]

Schulte

[11] Patent Number: 4,497,761
[45] Date of Patent: Feb. 5, 1985

[54] PROCESS FOR THE PRODUCTION OF SINTERED MAGNESITE FROM MAGNESIUM HYDROXIDE

[75] Inventor: Hans-Gerd Schulte, Ennigerloh, Fed. Rep. of Germany

[73] Assignee: Krupp Polysius AG, Beckum, Fed. Rep. of Germany

[21] Appl. No.: 261,733

[22] Filed: May 7, 1981

[30] Foreign Application Priority Data

Jun. 2, 1980 [DE] Fed. Rep. of Germany ....... 3020881

[51] Int. Cl.³ .................... C04B 33/32; C04B 35/04
[52] U.S. Cl. ........................................ 264/66; 423/636
[58] Field of Search .................. 264/66; 51/108; 423/636

[56] References Cited

U.S. PATENT DOCUMENTS 3,987,135 10/1976 Eiger et al. .................... 264/66

Primary Examiner—James Derrington
Attorney, Agent, or Firm—Learman & McCulloch

[57] ABSTRACT

The invention relates to a process for the production of sintered magnesite from magnesium hydroxide in which filter cake is size reduced in a stream of hot air to a certain particle size, after which the material is heated and calcined and the dehydrated powder thus obtained is hot briquetted and introduced hot into the sintering zone. This process is distinguished by its high economy on heat and by the production of a readily sinterable dehydrated powder.

16 Claims, 2 Drawing Figures

PROCESS FOR THE PRODUCTION OF SINTERED MAGNESITE FROM MAGNESIUM HYDROXIDE

BACKGROUND OF THE INVENTION

This invention relates to a process and an installation for the production of sintered magnesite from magnesium hydroxide in which a magnesium hydroxide suspension is first freed from water by filtration, the filter cake thus obtained is dried in a drying zone and heated and dehydrated in another heat-treatment zone, after which the powder-form dehydrated product is briquetted under pressure and the briquettes thus obtained are sintered in a sintering zone at a temperature in the range from 1800° to 2000° C.

The starting material used in a process of this type is a precipitated product which consists of very fine-grained $Mg(OH)_2$ crystallites having a particle size of less than $1\mu$ and in many cases as little as $0.1\mu$. The removal of water from the magnesium hydroxide suspension is carried out in settling tanks and then in suction or pressure filtration units. In suction filtration units, the water content may be reduced to around 50%, whereas in cases where pressure filtration is applied residual water contents of the order of 40% are obtained with frame filter presses, and residual water contents of around 25% are obtained where a special tube filter press is used.

In conventional processes, the filter cake thus obtained is then dried in a storey furnace and dehydrated. Dehydration in the storey furnace takes place at around 850° to 950° C. During its heat treatment for drying and dehydration in the storey furnace, the filter cake disintegrates into very fine particles most of which have a primary particle size of less than $1\mu$. This extremely fine powder is then compressed under high pressure in roller-type compacting presses into almond- or pillow-shaped briquettes in either two stages or in a single stage (in that case, however, with a high proportion of "returns" from sieving of the briquettes). Where fluted rollers are used, the powder is compressed into sticks. During the compressing or compacting operation, the dehydrated powder generally has a temperature of only 200° C. The briquettes are then sintered in rotary furnaces or shaft furnaces at temperatures in the range from 1800° to 2000° C., depending on the purity of the dehydrated powder. Sinter densities of 3.2 to 3.4 g/cc are obtained.

These known processes are attended by some serious disadvantages. The consumption of heat amounts to between about 3500 and 4000 kcal/kg of sintered MgO and is thus very high. Since the filter cake disintegrates substantially to primary particle size (i.e., crystalite size) during its drying and dehydration in the storey furnace, briquetting is very difficult and is characterized by a high energy consumption.

Another disadvantage lies in the lack of control over the dehydration process which adversely affects sinterability. This is because, through an excessively long residence time at temperatures above 800° C., crystallites begin to undergo fusion into relatively large agglomerates which impairs the vitrification properties. Another adverse effect on sinterability arises out of the charging of the sintering zone with almost cold briquettes or sticks because the slow heating of the agglomerates to the sintering temperature involves a loss of reactivity. Finally, the storey furances used for drying and dehydration are fairly unreliable in operation and necessitate high maintenance costs.

SUMMARY OF THE INVENTION

The object of the present invention is to obviate the aforementioned disadvantages by the provision of a process of the type mentioned which is distinguished by its high economy on heat and by which it is possible to produce a readily sinterable, highly reactive dehydrated powder characterized by a favorable particle size distribution for briquetting and by a wide range of variation of its specific surface. The process according to the invention is also intended to be able to be carried out in a structurally simple and operationally reliable installation.

According to the invention, this object is achieved by the following features:

(a) a mechanically strong feedstock having a moisture content below the thixotropy value is produced from the raw filter cake before it is introduced into the drying zone;

(b) the filter cake is then dried and at the same time calcined in a stream of hot air in such a way that its particle size distribution lies in the shaded area of the particle size diagram in FIG. 2;

(c) the powder-form material obtained by drying and size reduction is heated with the hot waste gases from the sintering zone and calcined by the measured addition of fuel to the gas stream at a temperature in the range from 650° to 1050° C. and over a short residence time; and (d) the dehydrated powder is hot-briquetted at a temperature in the range from 400° to 800° C. and the briquettes thus obtained are introduced hot into the sintering zone.

In order to be able to carry out the drying and size reduction of the filter cake provided for in the process according to the invention and hence to be able to adjust the fineness required for dehydration, the moisture content of the raw filter cake has to be lowered before its introduction into the drying and size-reducing stage to a level at which the filter cake is no longer thixotropic (thixotropic substances liquefy under shock or impact as encountered for example in percussive size reduction). The feedstock (having a moisture content below the thixotropic value) may be obtained by coarse grinding filter cakes obtained by tube filter pressure filtration to a particle size of less than 100 mm. However, tests have shown that it is also possible to produce the feedstock by mixing filter cake obtained by suction filtration or frame filter pressure filtration with dried or semidried fine-grained magnesium hydroxide. The mixing operation involved here is preferably carried out in positive mixer characterized by a kneading and grinding action.

The unit weight of the filter cake (as determined on dried fragments thereof) may be used as an indication of the degree of working-up of the filter cake. To guarantee a moisture content below the thixotropy value, a feedstock having a unit weight of more than 1.2 g/cc and preferably between 1.3 and 1.4 g/cc is best produced from the raw filter cake before it is introduced into the drying zone. Filter cakes having a unit weight of this order provide for uninterrupted operation at the drying and size-reducing stage and during subsequent heating and calcination.

It is essential during the drying and size-reducing operation to obtain a defined grain size distribution which is favorable to the subsequent calcining process. This grain size distribution should lie in the shaded area of the grain size diagram in FIG. 2 and preferably in the cross-hatched area. Greater fineness spoils the fluidity of the material in the cyclone heat exchanger used for heating and calcination, dust and material accumulating in the gas pipes and cyclones. On the other hand, greater coarseness adversely affects the heat-transfer conditions to a considerable extent, resulting in a greater consumption of heat and at the same time in a lower degree of calcination. This is because, since the very large pore volume greatly decelerates the transfer of heat into the interior of the particles, the core of excessively large particles is not calcined to the required extent.

Accordingly, the exact adjustment and maintenance of the fineness obtained during the drying and size-reducing operation is crucially important not only to the fluidity of the material in the following heat exchanger system, but also to the measured application of heat in the calcination process. This is absolutely essential for obtaining the primary particle size and primary particle form, i.e., for guaranteeing satisfactory sintering.

In the process according to the invention, the powder-form material obtained by drying and size reduction is heated with the hot waste gases from the sintering zone and briefly calcined at a temperature between 650° and 1050° C. by the measured introduction of additional fuel into the gas stream. Variation of the calcination temperature provides for considerable flexibility in regard to adjustment of the specific surface. Thus, at a calcination temperature of 650° C., for example, it is possible to obtain dehydrated powders having an extremely large specific surface of from 30 to 50 m²/g and extremely good sintering properties (after briquetting, these dehydrated powders may be sintered to very high densities at lower temperatures and with shorter residence times). On the other hand, any increase in the calcination temperature to beyond 1000° C., for example, produces a relatively small specific surface (about 1 m²/g). Powders such as these with a small specific surface can be of advantage providing they are not used for producing the sinters. Accordingly, by suitably selecting the calcination temperature, the process according to the invention enables dehydrated powders having a specific surface adapted to the particular application envisaged to be obtained.

The process according to the invention is very flexible not only in regard to the level of the calcination temperature, but also in regard to the other thermal conditions prevailing during dehydration. Thus, the amount of heat introduced during dehydration may be largely adapted to the specific properties of the magnesium hydroxide which largely emanate from the production conditions prevailing during precipitation of the Mg(OH)₂.

In addition to the adjustment of a certain particle fineness during the drying and size-reducing operation, a slightly different method of introducing heat into the cyclone heat exchanger, particularly into the calcination section, can be of advantage with some magnesium hydroxides. Thus, with certain dehydrated powders, dehydration has to be carried out on the shock principle.

It has proved to be of particular advantage to heat the powder-form material obtained by drying and size reduction with the hot waste gases from the sintering zone in a two-stage cyclone heat exchanger. Compared with a three-stage cyclone heat exchanger, a two-stage cyclone heat exchanger imposes far less mechanical stress on the powder-form material so that fewer fine particles are formed. This improves the flow properties of the powder-form material and avoids any danger of a pulsating flow of material or even blockages. No disadvantages in terms of heat economy are incurred by using only a two-stage cyclone heat exchanger because, in the process according to the invention, the waste gases of the cyclone heat exchanger are used for drying the filter cake.

The process according to the invention is thus distinguished by considerable advantages over the hitherto known processes. For example, the heat consumption for drying, dehydration, and sintering is around 40% to 60% lower than in conventional processes. The favorable particle structure of the dehydrated powder obtained during drying and size reduction facilitates compacting and briquettes characterized by high mechanical strength can be obtained by hot-briquetting the dehydrated powder at temperatures of from 400° to 800° C., and preferably at temperatures of from 600° to 750° C. The extremely short residence time of the material in the calcination stage at a temperature of from 650° to 1050° C. gives a highly reactive, optimally sinterable dehydrated powder of which the specific surface may be selected within wide limits.

The fact that the briquettes may be introduced hot into the sintering zone in the process according to the invention prevents the briquettes from becoming brittle through cooling. Accordingly, the briquettes retain their high mechanical strength so that the proportion of fines formed in the furnace through abrasion and briquette disintegration is reduced to a minimum and sintering is improved. At the same time, the so-called hot input considerably shortens the residence time of the agglomerates in the furnace pending arrival at the sintering temperature. The material retains its high reactivity virtually intact until reaching the temperature zone in which recrystallisation takes place at high velocity. It is thus possible to obtain high sinter densities more easily than in cases where the briquettes are introduced cold.

DETAILED DESCRIPTION

Figure 1:
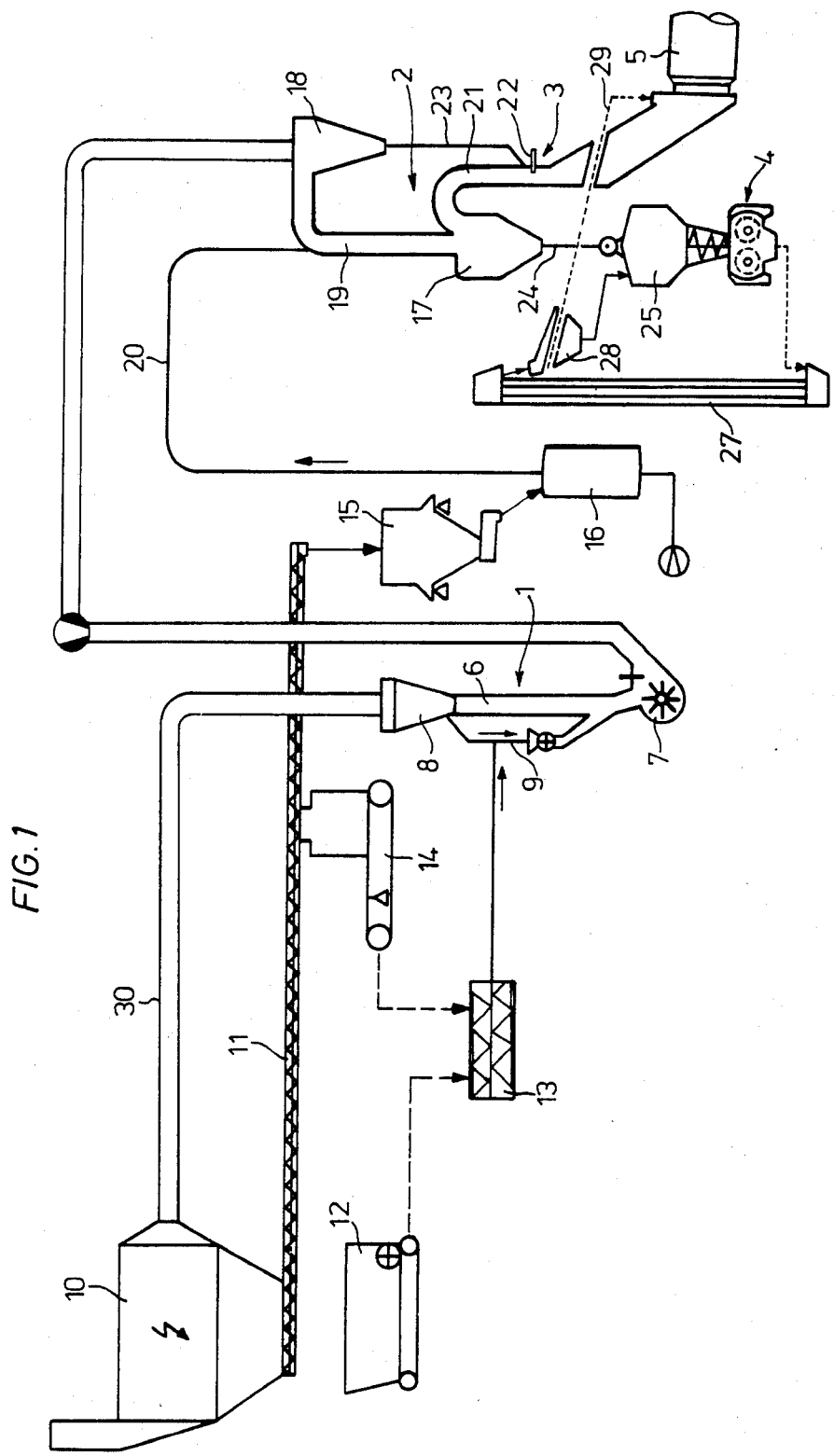
FIG. 1 is a diagrammatic view illustrating apparatus for carrying out the process according to the invention.

The apparatus comprises a drying and size-reducing stage 1, a two-stage cyclone heat exchanger 2 with a calciner 3, a briquetting press 4, and a revolving tubular furnace 5 which forms the sintering zone.

The drying and size-reducing stage 1 contains a vertical drying shaft 6 through which flow hot waste gases from the cyclone heat exchanger 2, a disintegrator (hammer) 7 arranged at the lower end of the shaft and a separator 8 which is arranged at the upper end of the shaft and which communicates with the disintegrator 7 through a return pipe 9.

The separator 8 is followed by an electrostatic filter 10 of which the separated material is returned into the system by a screw conveyor 11. Filter cake (from a filtration unit not shown) is delivered by a box feeder 12 to a mixer 13 which on the other hand receives fine-grained dried magnesium hydroxide via the screw conveyor 11 and a distributing belt weighing machine 14.

In addition, the screw conveyor 11 delivers the powder-form material obtained by drying and size reduction to a metering bin 15 which is followed by a pneumatic vertical conveyor 16. This vertical conveyor 16 delivers the material to the two-stage cyclone heat exchanger 2 which contains a lower cyclone 17 and an upper cyclone 18. The cyclone 17 communicates with the cyclone 18 through a gas pipe 19 into which opens the material pipe 20 coming from the pneumatic vertical conveyor 16.

The revolving tubular furnace 5 communicates with the lower cyclone 17 of the two-stage heat exchanger 2 through a gooseneck-like gas pipe 21 in which at least one burner 22 is provided and which forms the calciner 3. The material discharge pipe 23 of the cyclone 18 opens into this gas pipe 21 in the vicinity of the burner 22. The material discharge pipe 24 of the cyclone 17 opens into a thermally insulated intermediate container 25.

The briquetting press 4 is arranged below the intermediate container 25. A bucket elevator 27 designed to handle hot material carries the briquettes to a sieve 28 from which the droppings are returned to the intermediate container 25 while the briquettes pass through the connection 29 (diagrammatically) indicated in chain lines to the revolving tubular furnace 5.

The apparatus operates as follows:

In the drying and size-reducing stage 1, the filter cake is dried by the hot waste gases from the cyclone heat exchanger 2 and at the same time size-reduced by the disintegrator 7. The filter cake passes through the vertical drying shaft 6 into the separator 8. The coarse fraction deposited in the separator 8 drops back through the pipe 9 into the disintegrator and is returned (possibly several times) through the drying shaft 6 to the separator 8. The fine fraction of the filter cake is delivered by the drying gases leaving the separator 8 through the gas pipe 30 to the electrostatic filter 10, deposited there and then passes through the conveyor screw 11 into the metering bin 15.

The powder-form material (magnesium hydroxide) obtained by drying and size reduction is delivered by the pneumatic vertical conveyor 16 to the two-stage cyclone heat exchanger 2. It is initially introduced into the gas pipe 19 and delivered by the hot gases (which heat it) to the cyclone 18. After separation, it passes through the material discharge pipe 23 into the calciner 3 (gas pipe 21) where additional heat is applied by the burner 22. The material thus remains for a short, defined period at a temperature in the range from 650° to 1050° C. and is delivered to the cyclone 17 by the waste gases of the revolving tubular furnace 5. The calcined material separated in the cyclone 17 passes through the insulated intermediate container 25 into the briquetting press 4 at a temperature of around 700° to 800° C. After separation of the fines in the sieve 28, the briquettes enter the revolving tubular furnace 5 forming the sintering zone at a temperature of from about 500° to 700° C.

The invention is further illustrated by the following examples:

EXAMPLE 1

Filter cake obtained from a frame filter press having an MgO-content of 98.3% (based on no ignition loss) and a moisture content of 38% was processed with fine-grained, partly dried Mg(OH)$_2$ (moisture 2%), which emanated as the coarse component from the separator of the shaft dryer, in a roller-type edge-runner mill to form a firm, plate-like product. The two components were mixed in a quantitative ratio of 87.5% of moist filter cake to 12.5% of partly dried Mg(OH)$_2$. The material mixed in the edge runner mill assumed the form of platelets approximately 1 to 20 mm thick and had a combined moisture content of 33.5%, i.e., it was no longer thixotropic. Drying and size reduction were carried out in a free-fall shaft dryer through which flowed gases at a temperature of 410° C. (waste gases from the cyclone heat exchanger). Size-reduction of the plate-like dried material in the disintegrator traversed by the hot gas produced a powder having the following particle size distribution:

0.5 mm residue=4%
0.2 mm residue=17%
0.09 mm residue=26%

The Mg(OH)$_2$ separated in the electrostatic filter and dried to a residual moisture content of 0.8% was dehydrated in a cyclone heat exchanger at a material temperature in the calciner of 670° C. (residual ignition loss 0.55%). The calcine entering the intermediate container preceding the briquetting press had the following particle size distribution:

0.5 mm residue=3.7%
0.2 mm residue=14.7%
0.09 mm residue=27.0%

The material temperature during briquetting was between 590° and 630° C. Briquette densities of from 1.98 to 2.12 g/cc were obtained. The briquettes were vitrified in an oil-fired revolving tubular furnace. The temperature in the hottest zone of the furnace was at 1930° C. The heat treatment in the revolving tubular furnace lasted between about 6.5 and 7.5 hours. A final density of 3.34 g/cc on average was obtained.

EXAMPLE 2

Starting material: filter cake (MgO=98.3%, based on no ignition loss) from suction filtration having a moisture content of 48%.

Mixing with shaft dryer grits (2% moisture) in the roller-type edge runner mill as follows:

65.2% of filter cake (moist)
34.8% of shaft dryer grits
32.0% combined moisture

The gas temperature on entering the shaft dryer was 820° C. Waste gases from the cyclone heat exchanger (temperature 400° C.) and gases from a combustion chamber (temperature 980° C.) were used as the drying gases.

The following material fineness was obtained after the shaft dryer:

0.5 mm residue=3.0%
0.2 mm residue=7.4%
0.09 mm residue=18.0%

The material fineness after the cyclone heat exchanger was as follows:

0.5 mm residue=3.7%
0.2 mm residue=14.7%
0.09 mm residue=27.0%

0.05 mm residue means the residue left on a 5 mm mesh sieve.

The material temperature in the calciner was 720° C. (residual ignition loss 0.75%).

The briquetting temperature was between 610° and 670° C.

The density of the briquettes was between 1.95 and 2.05 g/cc.

Sintering in the revolving tubular furnace was carried out at 1900° to 1920° C., the total residence time in the revolving tubular furnace amounting to between 6 and 7 hours. An average sinter density of 3.32 g/cc was obtained.

I claim:

1. A process for the production of sintered magnesite from magnesium hydroxide filter cake feedstock, said process comprising the successive steps of (1) reducing the moisture content of said feedstock to below its thixotropy value; (2) size reducing said feedstock to produce powder-form material having a particle size distribution lying in the shaded area of the particle size diagram of FIG. 2; (3) calcining said powder-form material at a temperature of between about 650° to 1050° C. to produce dehydrated powder; (4) briquetting sid powder at a temperature of between about 400° to 800° C. to form briquettes; and (5) sintering said briquettes in a sintering zone at a temperature of between about 1800° to 2000° C.

2. A process according to claim 1 including using hot gases from said sintering zone in the calcining of said powder-form material.

3. A process according to claim 2 including combusting fuel in the presence of said powder-form material to calcine the latter.

4. A process according to claim 1 wherein said feedstock has an initial unit weight of between 1.2 g/cc and 1.4 g/cc.

5. A process according to claim 1 wherein said feedstock has an initial particle size of less than 100 mm.

Figure 2:
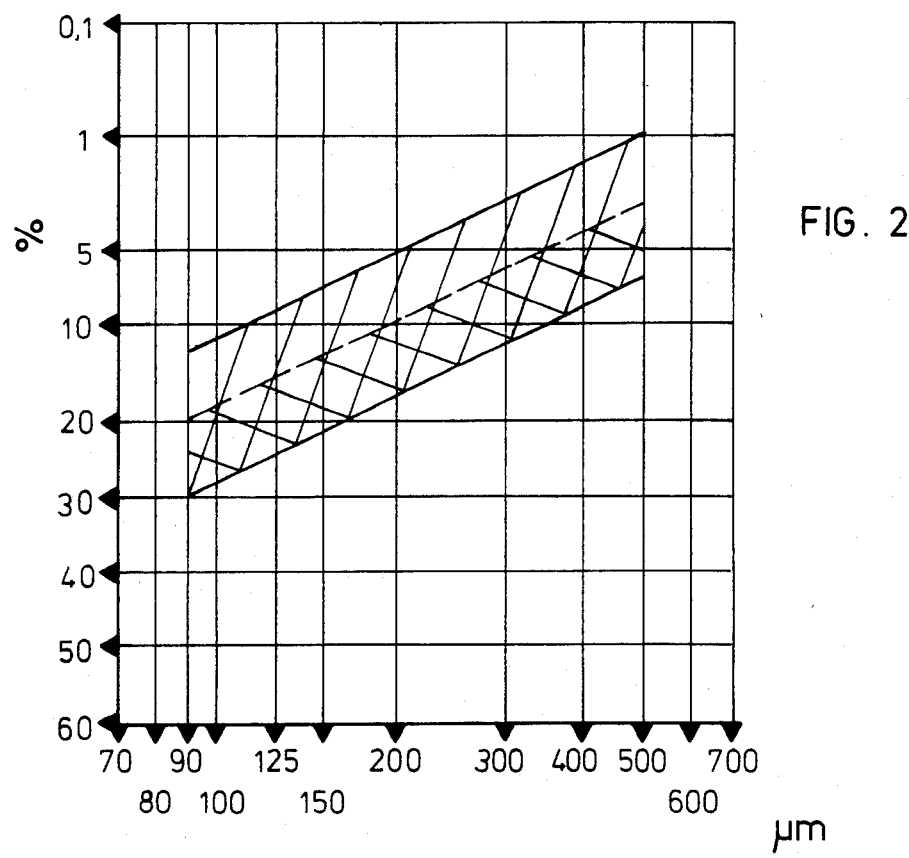
FIG. 2 is a graph illustrating the preferred grain size distribution.

6. In a process for the production of sintered magnesite from magnesium hydroxide, wherein a magnesium hydroxide suspension is dehydrated by filtration to obtain a filter cake, the filter cake is reduced to a powder-form product, calcined, and briquetted under pressure, and the briquettes thus obtained are sintered in a sintering zone, the improvement comprising:

(a) first producing from the filter cake a feedstock having a moisture content below the thixotropy value and a unit weight of between 1.3 and 1.4 g/cc;

(b) then drying, claicining, and size-reducing such feedstock in a stream of hot gases from said sintering zone to produce powder-form material having a particle size distribution lying in the shaded area of the particle size diagram of FIG. 2;

(c) calcining said powder-form material at a temperature of between about 650° and 1050° C.;

(d) briquetting the clacined powder-form material at a temperature in the range from between about 400° to 800° C.; and (e) sintering the briquettes at a temperature in the range from between about 1800° to 2000° C.

7. A process according to claim 6 including producing said feedstock by coarse grinding magnesium hydroxide filter cake obtained by tube filter pressure filtration.

8. A process according to claim 6 including producing said feedstock by mixing magnesium hydroxide filter cake obtained by suction filtration with dried or partly dried fine-grained magnesium hydroxide.

9. A process according to claim 6 including producing said feedstock by mixing magnesium hydroxide filter cake obtained by frame filter pressure filtration with dried or partly dried fine-grained magnesium hydroxide.

10. A process according to claim 9 including mixing said magnesium hydroxide filter cake and said fine-grained magnesium hydroxide in a positive mixer having a grinding and kneading action.

11. A process according to claim 1 including using hot gases from said sintering zone to reduce the moisture content of said feedstock.

12. A process according to claim 6 including passing said powder-form material through a multiple stage vertical cyclone and calcining said material in the lowermost stage of said cyclone.

13. A process according to claim 12 including storing calcined material in a thermally insulated container between the calcining and briquetting thereof.

14. A process according to claim 1 including size reducing said feedstock to produce powder-form material having a particle size distribution lying in the hatched area of the particle size diagram of FIG. 2.

15. A process according to claim 6 including combusting fuel in the presence of said powder-form material to supplement the heat of the hot gases from said sintering zone.

16. A process according to claim 6 including reducing the size of said feedstock to powder-form material having a particle distribution size lying in the hatched area of the particle size diagram of FIG. 2.

* * * * *